April 9, 1963　　　H. L. BOWDITCH　　　3,084,550
PNEUMATIC SERVO CONTROL
Filed Sept. 23, 1960　　　3 Sheets-Sheet 1
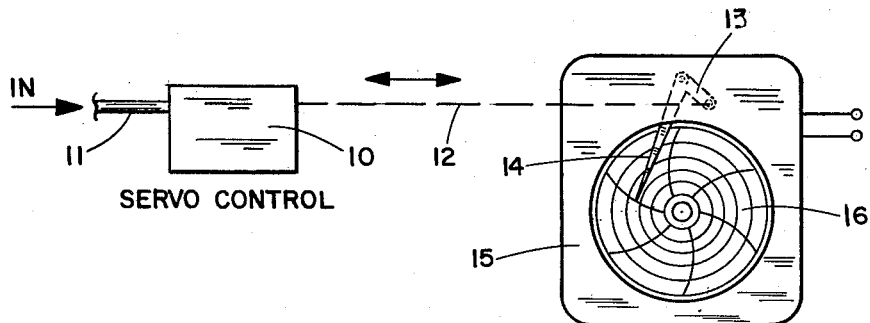
FIG. I
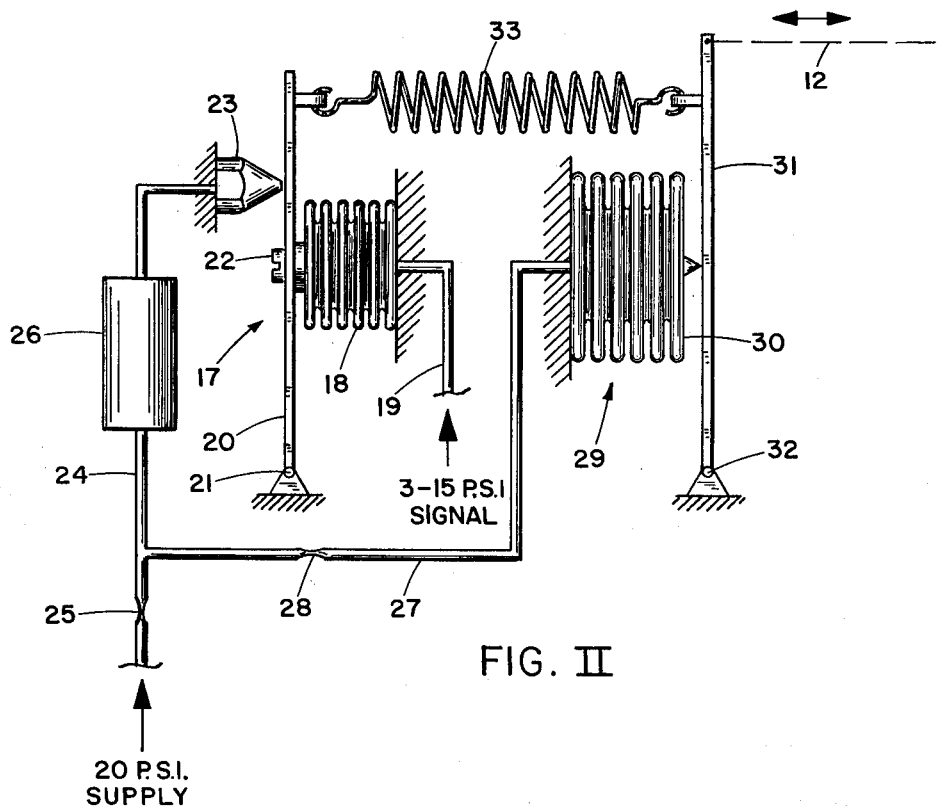
FIG. II
INVENTOR
HOEL L. BOWDITCH
BY
Lawrence H. Porton
AGENT April 9, 1963  H. L. BOWDITCH  3,084,550
PNEUMATIC SERVO CONTROL
Filed Sept. 23, 1960  3 Sheets-Sheet 2
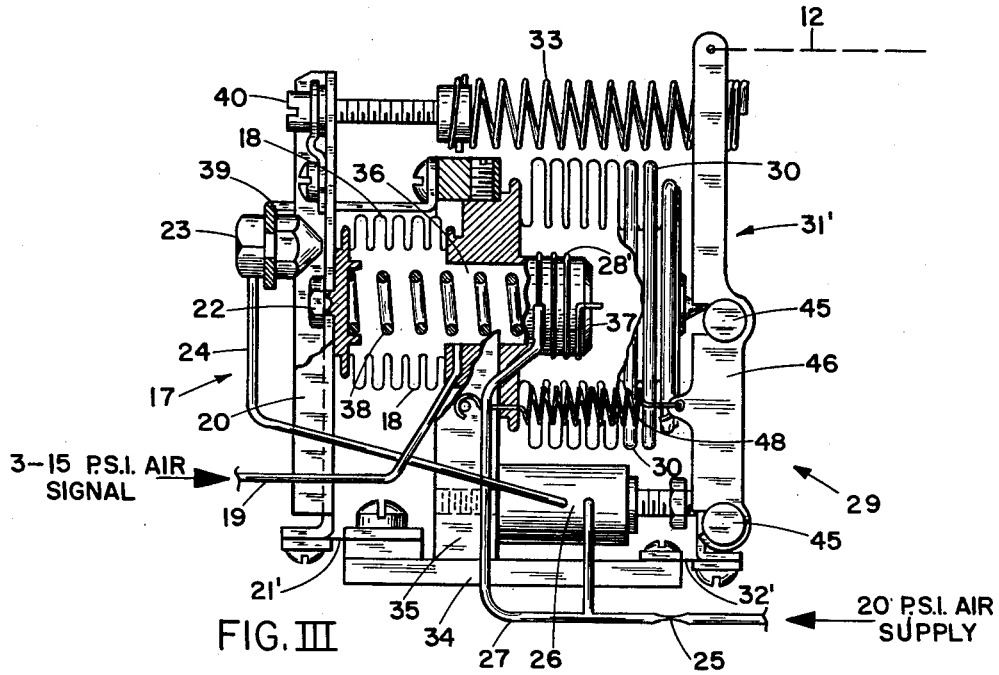
FIG. III
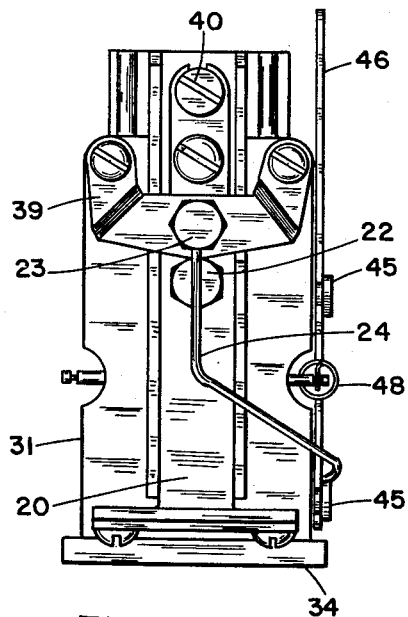
FIG. IV
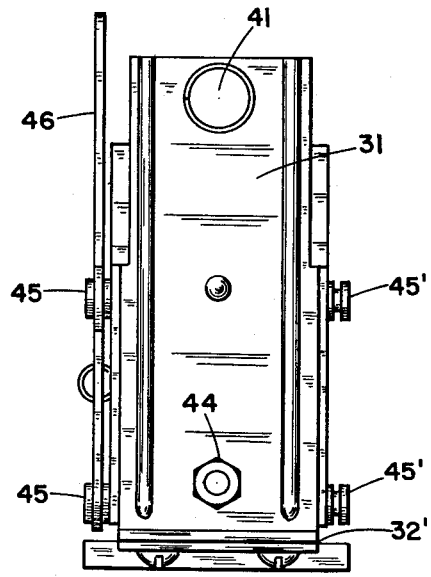
FIG. V
INVENTOR
HOEL L. BOWDITCH
BY Lawrence H. Poston
AGENT April 9, 1963 H. L. BOWDITCH 3,084,550
PNEUMATIC SERVO CONTROL
Filed Sept. 23, 1960 3 Sheets-Sheet 3
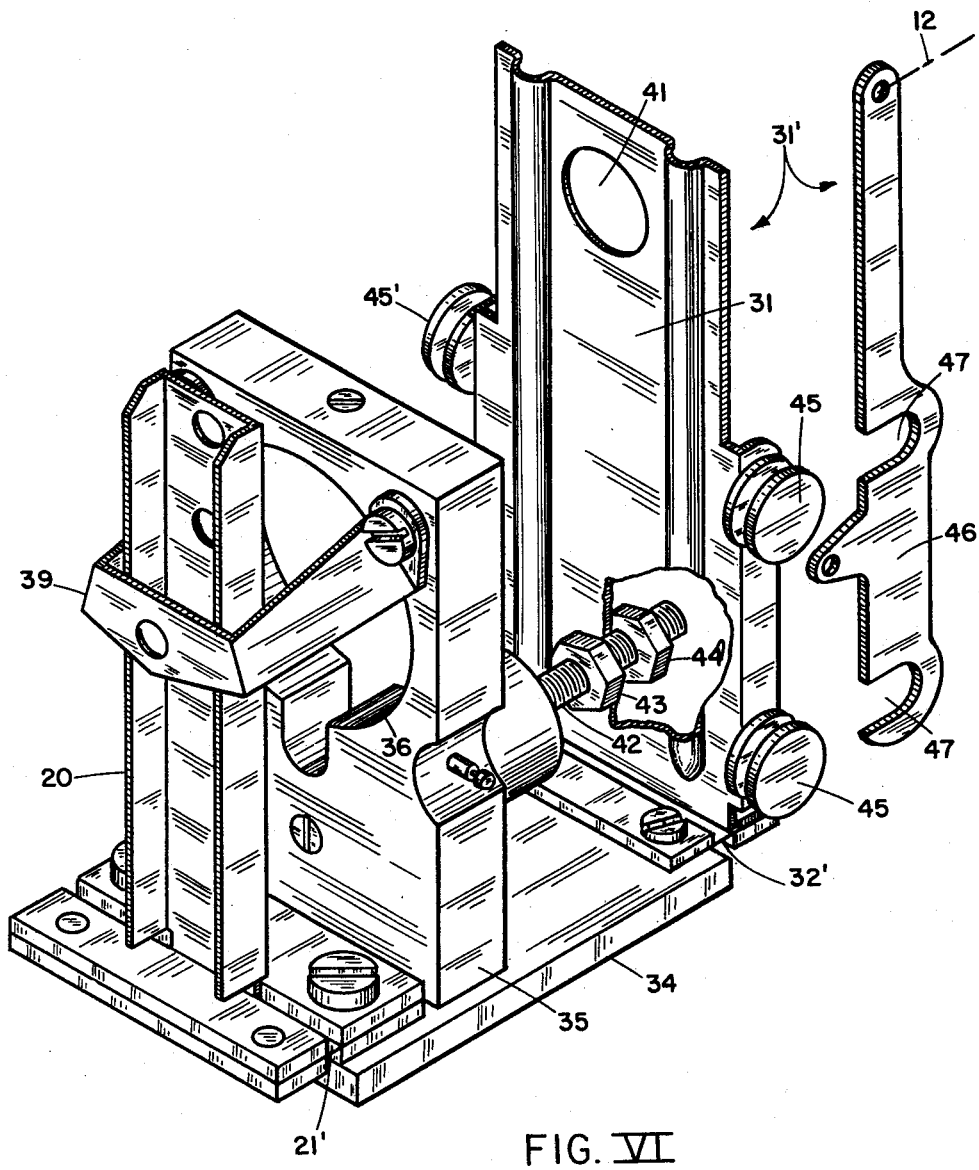
FIG. VI
INVENTOR
HOEL L. BOWDITCH
BY
AGENT

United States Patent Office 3,084,550
Patented Apr. 9, 1963

3,084,550
PNEUMATIC SERVO CONTROL
Hoel L. Bowditch, Foxboro, Mass., assignor to The Foxboro Company, Foxboro, Mass., a corporation of Massachusetts
Filed Sept. 23, 1960, Ser. No. 58,126
1 Claim. (Cl. 73—407)

This invention relates to control means for operating devices such as recorder pen arms, and has particular references to new and improved pneumatic control means.

In the past, recorder pen arm arrangements have been delicate and light-weight. In many cases it has been desirable to operate associated devices from the same signal, and difficulty was found because of the extra loads involved.

The present invention provides a strong power factor to the operation of such devices and arrangements so that strength can be built into them. Further, a feedback is then provided so that within operating limits, the desired action is accomplished, whatever the load.

This device provides much greater output force, more linear and accurate, and makes possible much stiffer pickup devices such as recorder pens and linkages.

This invention provides first an input signal force bar operating with respect to a pneumatic nozzle, and then a movement bar operating with respect to feedback from the nozzle, with the force and movement bars joined by force spring. Thus, for any given pneumatic input signal, movement power is applied to the movement bar until the proper position is reached.

It is therefore an object of this invention to provide a new and useful control system involving pneumatic servo arrangements with respect to register devices such as indicators, recorders, or signal transfer means.

It is a further object of this invention to provide an all-flexured structure whereby there is a minimum of friction, wear and lost motion.

Other objects and advantages of this invention will be in part apparent and in part pointed out hereafter, and in the accompanying drawings, wherein:

FIGURE I is a schematic illustration of an industrial instrument recorder combination according to this invention;

FIGURE II is a schematic illustration of the servo control unit of FIGURE I;

FIGURE III is a face view of a structure as represented by FIGURE II;

FIGURE IV is a left end showing of the structure of FIGURE III;

FIGURE V is a right end showing of the structure of FIGURE III; and

FIGURE IV is a perspective of the main body structure of the device of FIGURES III, IV, and V, minus bellows and springs for clarity.

In FIGURE I, the servo control unit is indicated at 10, with a pneumatic signal input at 11. Such an input signal may be representative of a variable process condition, or any other signal which may be presented in pneumatic form.

The output of unit 10 is indicated as a movement by dotted line 12, which, in this illustration, is applied to a recorder pen linkage 13 to operate a recorder pen 14 in a standard industrial instrument 15 in the form of a recorder with a rotating chart 16.

In the showing of FIGURE II, the device comprises a primary arrangement 17 as a force bar situation involving very little movement. An input bellows 18 is mounted for expansion tendency to the left, and a pneumatic input pipe 19 is provided to deliver pneumatic input signals to the interior of the input bellows 18.

An upright force bar 20 is pivotally mounted at its lower end 21. About midway vertically of the force bar 20, it is secured, as by a bolt 22, to the outer, force tendency end of the bellows 18. Thus a pneumatic signal increase in the bellows 18 tends to pivot the force bar 20 counter-clockwise.

Above the bellows point (22) on the force bar, and on the opposite side thereof with respect to the bellows, a pneumatic nozzle 23 is mounted to face the force bar as a baffle with respect to pneumatic flow out of the nozzle 23. In the balance situation which is essentially maintained in the operation of this overall system, a small air gap is maintained between the mouth of the nozzle 23 and the force bar 20 in its capacity of a baffle in the thus established pneumatic nozzle-baffle arrangement.

The nozzle 23 is fed from a pneumatic supply through a feed pipe 24, by way of a restrictor 25 and a capacity chamber 26 according to the needs of the device in the standard operation of a nozzle.

In the course of operation of the primary arrangement 17, very small movements of the force bar 20 cause variation in the restriction of pneumatic flow from the nozzle 23. As the nozzle 23 becomes more restricted, a back pneumatic pressure is built up. This back pressure is taken off through a feedback pressure pipe 27. In this pipe also, is a restrictor 28, and pneumatic capacity is provided through the length and diameter factors of the pipe in accordance with the needs of control and delivery of pneumatic feedback as desired.

Further in FIGURE II, the device comprises a secondary, feedback arrangement as a movement bar situation 29. A feedback bellows 30 is provided, mounted for expansion movement to the right, and the feedback pipe 27 leads the pneumatic feedback pressure to and into the feedback bellows 30.

In the movement bar situation 29, an upright, movement bar 31 is provided, pivotally mounted at its base at 32. The movement bar 31 is held in engagement with the expansible end of the feedback bellows 30 by a coil spring 33 which connects the top portion of the movement bar 31 with the top portion of the force bar 20. Finally, the movement bar 31 is the output device of the system, and its movement is transferred as in dotted line 12 to whatever device is being operated, such as the recorder 15 of FIGURE I.

Accordingly, as in FIGURE II, pressure in the input bellows 18 tends to further restrict the pneumatic nozzle 23. The pneumatic back pressure thus built up is applied to the feed-back bellows 30, thus tending to move the movement bar 31 to the right. But this action tends, through the coil spring 33, to draw the force bar 20 away from the nozzle 23. Thus the nozzle restriction is diminished and the feedback pressure is lessened. Consequently, the whole system achieves a balance, with the movement of the movement bar 31 representative of the pneumatic signal introduced into the input bellows 18.

Through this device, substantial power may be applied to do whatever work is desired. This power is adaptive to whatever load is present. The same system according to this invention may be used whether, for example, the FIGURE I recorder uses only the pen arm 14, or whether various other devices, timers, or signal transfer devices or the like, are added to the load. This action is provided with greater linearity and accuracy.

FIGURES III, IV, V, and VI are different drawings of the same actual structure according to this invention. For the most part this actual structure is identical with the schematic system of FIGURE II. Like reference numbers have been applied to like parts, throughout the drawings.

The structure of FIGURES III through VI is provided with a basic framework illustrated in FIGURE VI. There is a base plate 34, with a central fixed upright support plate 35, for mounting the input and feedback bellows 18 and 30 as shown in FIGURE III.

With respect to FIGURE III, the upright support plate 35 has a transverse opening 36 therethrough. The input bellows 18 is open-end mounted over the left end of this opening 36 and a cup member 37 is open-end mounted over the right end of this opening. Within the overall opening thus formed, a coil spring 38 is based on the bottom of the cup 37 and biases the left end face of the bellows 18 to the left.

The FIGURE III structure shows the force and movement bars mounted for pivotal movement on flexures as at 21' and 32'. The nozzle 23 is mounted on a bracket 39 which is based on the central support 35. The connecting spring 33 is mounted in the movement situation 29 for rotation to vary the effective number of coils as a span adjustment and in the force situation 17 with a screw 40 rotary adjustment for tension variation as a zero adjustment.

It may be noted that the restriction in the feedback pipe 27 is provided in the FIGURE III structure as a capillary portion 28' wound on the outside of the support plate cup 37. The feedback bellows 30 is mounted over the cup 37 and on the right side of the support plate 35.

The movement situation 29 comprises an assembly 31' illustrated in FIGURE VI. The movement bar 31 is pivotally mounted on the flexure 32'. It is provided with an upper opening 41 to receive the right end of the coil spring 33 (FIGURE III). This opening is smaller than the outer diameter of the spring 33 so that rotation of the spring threads the whole spring through the hole 41 to change the effective number of coils in the spring. The movement bar 31 is also provided with an opening near its base, with a bolt 42 extending therethrough from a fixed connection to the support plate 35. Nuts 43 and 44 are mounted adjustably on the bolt 42 on either side of the movement bar 31 as limit stops with respect to the possible movement of the bar 31 about its flexure pivot 32'.

The movement bar 31 is provided with laterally extending channelled lugs 45 as mounting pivots for a movement transfer arm 46 having U-shaped pivot recesses 47 therein for mounting in the channels of the lugs 45. A coil spring 48 connected between the transfer arm 46 and the support plate 35 tends to hold the transfer arm in place on the lugs 45 so that the transfer arm moves with the movement arm 31 to produce the output movement as indicated at 12.

However, beyond certain selected force factors, movement of the movement arm 31 will cause the transfer arm to pivot about one or the other of the lugs 45 and to leave the other of the lugs. As in FIGURE V, other lugs 45' are provided on the other side of the device for use with another transfer arm (not shown) or a second portion (not shown) of the transfer arm 46, as desired.

Referring to FIGURE III, the spring 38 applies a force addition to the input bellows 18, requiring additional force to be developed by increasing pressure in the feedback bellows 30. This action forces the level of operation within the feedback bellows 30 to a middle point with respect to the range of total supply pressure. Thus for increasing or decreasing loads, equivalent forces are available.

This invention, therefore, provides a new and useful servo control system including instrumentation register devices such as indicators, recorders, and signal transfer devices.

As many embodiments may be made of the above invention, and as changes may be made in the embodiments set forth above without departing from the scope of the invention, it is to be understood that all matter hereinbefore set forth or shown in the accompanying drawings is to be interpreted as illustrative only and not in a limiting sense.

I claim:

A pneumatic servo register control system wherein a recording pen is moved in accordance with an input pneumatic signal and wherein the recording pen position is a factor in the application of movement force to the recording pen, said system comprising, in combination, a base, a central upright fixed support on said base, a transverse opening through said support, a laterally disposed cup member mounted on said support and extending said opening to terminate in a vertical wall as the bottom of said cup, an input bellows mounted on one side of said support and sealed around said opening to provide a continuous chamber consisting of the input bellows on one side of said support, said transverse opening, and said cup, a coil spring mounted in said chamber with one end based on said cup bottom and the other end based on the inside of the input bellows laterally outer end wall, a pneumatic input connection pipe into said input bellows for applying pneumatic force through said input bellows in one lateral direction away from said support, a feedback bellows mounted on the opposite side of said support and over said cup for expansion in the opposite lateral direction away from said support, a force bar upright on said base and pivoted thereto and engaging said input bellows to be affected by said input bellows force, a pneumatic nozzle opposing said input bellows with respect to said force bar and variably restricted according to said input bellows force, a movement bar upright on said base and pivoted thereto and engaging said feedback bellows at essentially the same point for all positions of said movement bar so as to be affected by said feedback bellows expansion, a pneumatic back pressure connection from said nozzle to said feedback bellows, a coil form force spring connecting said force bar and said movement bar, said coil spring having one end mounted through a lesser diameter hole in said movement bar for rotation adjustment of said spring to vary the effective number of coils as a span adjustment for the system, said coil spring having a rotary adjustment screw mounting of its other end to said force bar for tension variation as a zero adjustment for the system, a movement take-off force limit device in the form of an arm for applying movement of said movement bar to the recording pen and vertically disposed along said movement bar on two U pivots, one above the other, with said U form open toward said central upright, a coil spring between said central upright and said take-off arm at a point between said pivots to tend to maintain said take-off arm in releasable bias engagement with said movement bar through said U pivots under normal force conditions, and a two-direction movement limit stop device for limiting the movement of said movement bar at each end of a predetermined range of movement of said movement bar, whereby said releasable bias is operable within said movement range to limit the output force of said system in either direction.

References Cited in the file of this patent

UNITED STATES PATENTS

| | | |
|---|---|---|
| 2,408,685 | Rosenberger | Oct. 1, 1946 |
| 2,638,874 | Woodhull | May 19, 1953 |
| 2,770,246 | Shafer et al. | Nov. 13, 1956 |
| 2,789,543 | Papowsky | Apr. 23, 1957 |
| 2,866,339 | Rhodes et al. | Dec. 30, 1958 |